United States Patent
Singh et al.

(10) Patent No.: US 10,045,267 B2
(45) Date of Patent: Aug. 7, 2018

(54) DATA COMMUNICATION SYSTEM REDIRECTION OF A MEDIA SESSION TO USER EQUIPMENT

(71) Applicant: Sprint Communications Company L.P., Overland Park, KS (US)

(72) Inventors: Jasinder Pal Singh, Olathe, KS (US); Siddharth Oroskar, Overland Park, KS (US); Nitesh Manchanda, Overland Park, KS (US); Rajil Malhotra, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/708,659

(22) Filed: Sep. 19, 2017

(65) Prior Publication Data

US 2018/0007601 A1 Jan. 4, 2018

Related U.S. Application Data

(63) Continuation of application No. 15/014,463, filed on Feb. 3, 2016, now Pat. No. 9,813,961.

(51) Int. Cl.
*H04W 36/14* (2009.01)
*H04L 29/06* (2006.01)
*H04W 36/00* (2009.01)
*H04W 80/04* (2009.01)

(52) U.S. Cl.
CPC ......... *H04W 36/14* (2013.01); *H04L 65/1006* (2013.01); *H04W 36/0055* (2013.01); *H04W 80/04* (2013.01)

(58) Field of Classification Search
CPC ..................... H04W 36/0005–36/0016; H04W 36/005–36/0066; H04W 36/14; H04W 80/04; H04L 65/1006
See application file for complete search history.

(56) References Cited

U.S. PATENT DOCUMENTS

| | | |
|---|---|---|
| 2007/0206568 A1 | 9/2007 | Silver et al. |
| 2008/0009287 A1 | 1/2008 | Donovan |
| 2011/0098050 A1 | 4/2011 | Eipe et al. |
| 2011/0098051 A1 | 4/2011 | Kamalaraj et al. |
| 2012/0320817 A1 | 12/2012 | Xu et al. |
| 2013/0183971 A1 | 7/2013 | Tamaki et al. |
| 2013/0208649 A1 | 8/2013 | Waldhauser et al. |
| 2014/0064124 A1 | 3/2014 | Paladugu et al. |
| 2014/0256343 A1 | 9/2014 | Shaikh et al. |
| 2014/0376511 A1 | 12/2014 | Kalapatapu et al. |

*Primary Examiner* — Eric Myers (57) ABSTRACT

A User Equipment (UE) registers with a Long Term Evolution (LTE) network. The UE registers with an Internet Multimedia Subsystem (IMS) over the LTE network. The UE registers with a Wireless Fidelity (WIF) network. The UE receives a status request from the LTE network responsive to a Session Initiation Protocol (SIP) invite for the UE received at the IMS. The UE transfers a status response to the LTE network that indicates the WIFI network responsive to the status request. The UE receives the SIP invite from the IMS over the WIFI network. The UE exchanges user data for the media session over the WIFI network.

20 Claims, 7 Drawing Sheets

DATA COMMUNICATION SYSTEM REDIRECTION OF A MEDIA SESSION TO USER EQUIPMENT

RELATED CASES

This patent application is a continuation of U.S. patent application Ser. No. 15/014,463 that was filed on Feb. 3, 2016 and is entitled "DATA COMMUNICATION SYSTEM REDIRECTION OF A MEDIA SESSION TO USER EQUIPMENT." U.S. patent application Ser. No. 15/014,463 is hereby incorporated by reference into this patent application.

TECHNICAL BACKGROUND

Wireless communication systems provide User Equipment (UE), such as smartphones, tablet computers, and other media devices, wireless access to communication services and allow users to move about and communicate over the air with access communication networks. Data communication networks, such as Long Term Evolution (LTE), exchange data packets with UEs to provide services, such as internet access, media streaming, voice calls, and text messaging.

Using LTE, a UE detects and attaches to an LTE base station, such as an evolved NodeB (eNodeB). eNodeBs supports the exchange of signaling and data to LTE network elements, such as Serving Gateways (S-GWs), Mobility Management Entities (MMEs), Packet Data Network Gateways (P-GWs), Policy Charging Rules Functions (PCRFs), and other network elements. eNodeBs schedule resources to receive and transfer data and signaling for multiple UEs and may monitor network loading and congestion, signal strengths, and data retransmission rates to ensure a Quality-of-Service (QoS) level for media sessions.

Session Initiation Protocol (SIP) is a popular form of signaling to control the exchange of Internet Protocol (IP) packets between UEs for media sessions and other data transfer services. The UE registers an IP addresses with the SIP systems over the IP access networks and SIP control systems, such as an Internet Multimedia Subsystem (IMS). The SIP control systems use the registered IP addresses to exchange SIP messaging for the IP communications sessions. A UE may register with a SIP control system directly using various access systems, including LTE, Code Division Multiple Access (CDMA), Global System for Mobile Communications (GSM), Ethernet, and other access systems.

While an LTE eNodeB may support various UEs and traffic types, the LTE eNodeB does not have unlimited resources which may result in conflicts and packet loss. An IMS may use an alternative network to exchange SIP messaging, but unfortunately, current interactions between the LTE network and IMS are not effective for redirecting to a better, alternative network.

TECHNICAL OVERVIEW

User Equipment (UE) registers with a Long Term Evolution (LTE) network. The UE registers with an Internet Multimedia Subsystem (IMS) over the LTE network. The UE registers with a Wireless Fidelity (WIF) network. The UE receives a status request from the LTE network responsive to a Session Initiation Protocol (SIP) invite for the UE received at the IMS. The UE transfers a status response to the LTE network that indicates the WIFI network responsive to the status request. The UE receives the SIP invite from the IMS over the WIFI network. The UE exchanges user data for the media session over the WIFI network.

DETAILED DESCRIPTION

Figure 1:
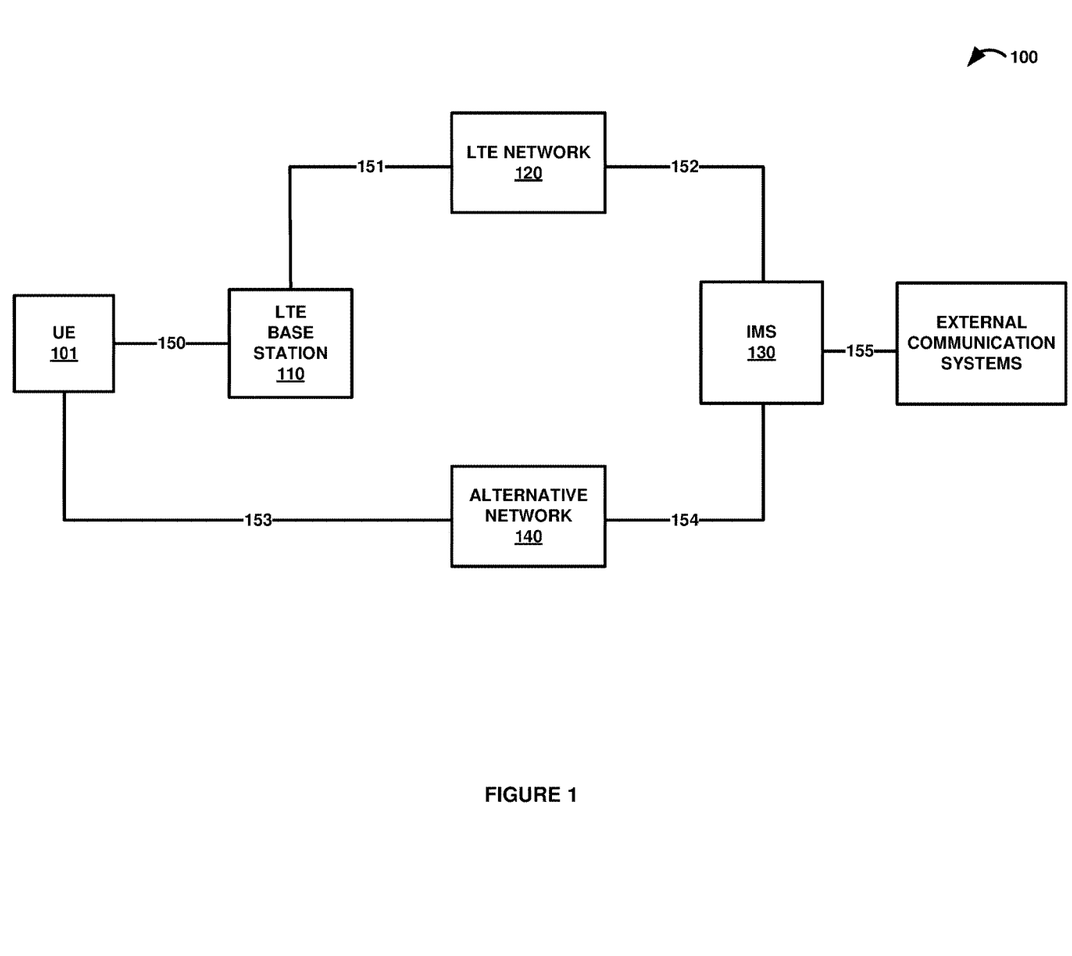
FIGS. 1-3 illustrate a data communication system to redirect a media session to User Equipment (UE).
Figure 2:
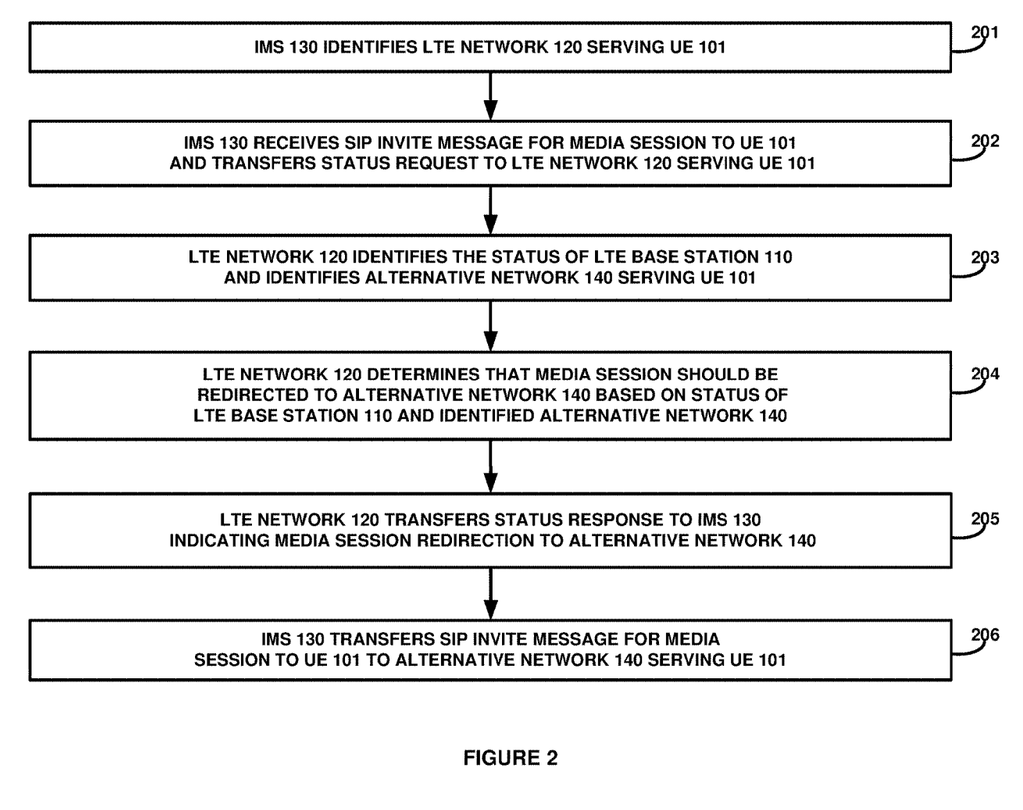
Figure 3:
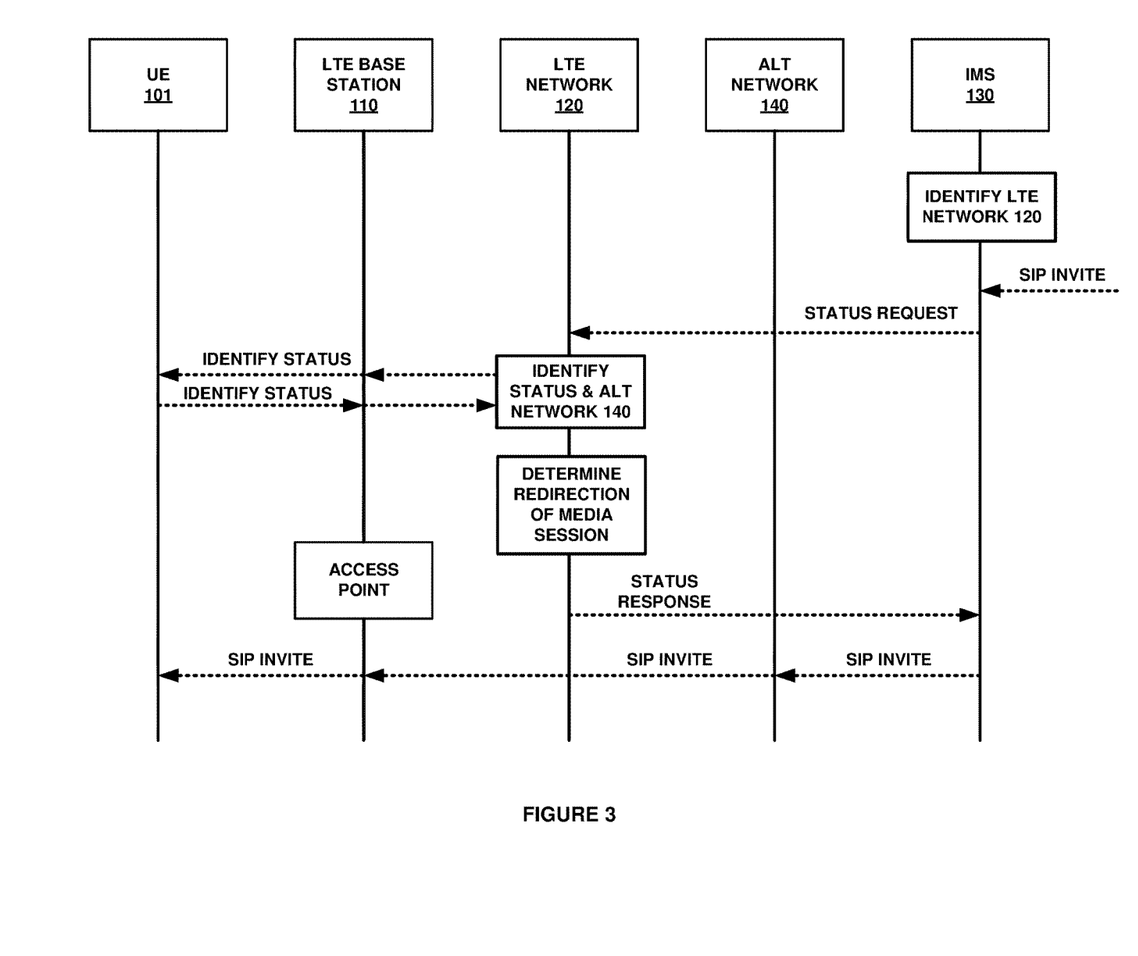

FIGS. 1-3 illustrate data communication network 100 to redirect a media session for User Equipment (UE) 101. Data communication network 100 includes UE 101, Long Term Evolution (LTE) base station 110, LTE network 120, Internet Multimedia Subsystem (IMS) 130, alternative communication network 140, and external communication systems. UE 101 and LTE base station 110 communicate over signaling link 150. LTE base station 110 and LTE network 120 communicate over communication link 151. LTE network 120 and IMS 130 communicate over communication interface 152. UE 101 and alternative communication network 140 communicate over communication link 153. Alternative communication network 140 and IMS 130 communication over communication interface 154. IMS 130 communicates with external communication systems over communication link 155.

In operation, IMS 130 identifies LTE network 120 serving UE 101. IMS 130 may detect LTE network 120 serving UE 101 by UE 101 registering with IMS 130 upon attachment to LTE network 120. As part of the registration process, default bearers are typically set up for UE 101, such as a Quality-of-Service (QoS) Class Identifier (QCI) 5 to exchange SIP signaling messages. UE 101 may be capable of establishing multiple bearers. For example, UE 101 may register an IP address with IMS 130 upon attachment to LTE network 120 over LTE base station 110 and a QCI 5 may be established to exchange SIP signaling messages.

In a next operation, IMS 130 receives a Session Initiation Protocol (SIP) Invite message for the media session to UE 101. IMS 130 typically receives the SIP Invite message for the media session in a Proxy-Call Session Control Function (P-CSCF) from an initiating UE. The SIP Invite message is used to establish the media session between users and typically indicates a domain name of the end UE and the QoS requirements for the media session, such as the establishment of a dedicated bearer specific to the traffic type for requested media session. The media session may comprise a conversational voice call, a conversational video call, video streaming, or some other media service. For example, a UE initiating a voice call to UE 101 may indicate in a SIP Invite message that a conversational voice bearer is required to establish the requested conversational voice call.

IMS 130 then transfers a status request to LTE network 120 serving UE 101. The status request is typically sent over an Rx interface from the terminating UE's P-CSCF in IMS 130 to a Policy Charging and Rules Function (PCRF) in LTE network 120 indicating that a media session has been requested with UE. The status request may include the QoS requirements for the media session, a traffic bearer type, and other data required to initiate the media session. For example, a P-CSCF in IMS 130 may send a request to a PCRF in LTE network 120 indicating that a voice call has been initiated by a UE to UE 101 requiring a dedicated voice bearer. In this example, the PCRF in LTE network 120 may determine that a QCI 1 is required and send a request to a Mobility Management Entity (MME) to determine a number of QCI 1s currently active for LTE base station 110.

In response to the status request, LTE network 120 identifies a status of LTE base station 110 serving UE 101 and identifies alternative communication network 140 serving UE 101. LTE network 120 may identify a status of LTE base station 110 by the MME sending the status request to an evolved NodeB (eNodeB) serving UE 101. LTE network 120 may also identify a status of LTE base station 110 based on data stored on the MME or by querying a Home Subscriber System (HSS). LTE network 120 may also identify a status of LTE base station 110 serving UE 101 by transferring a paging message to UE 101 and receiving a paging message from UE 101 over LTE base station 110. For example, an MME in LTE network 120 may identify a status of LTE base station 110 by determining an amount of media sessions that have been initiated over LTE base station 110 over a period of time.

The status request to LTE base station 110 serving UE 101 may request a bearer loading rate, Transmission Control Protocol (TCP) retransmission rate, Hybrid Automatic Repeat Request (HARQ) retransmission rate, and other real time congestion qualifiers, such as resource block congestion, packet loss, packet latency, and packet jitter. For example, the MME serving LTE base station 110 in LTE network 120 may receive a status request from the PCRF requesting a QCI 1 loading rate of LTE base station 110 before forwarding the SIP Invite message from the initiating UE requesting a voice call with UE 101. In this example, the MME in LTE network 120 may query LTE base station 110 of a current QCI 1 loading rate and compare the loading rate to a threshold QCI 1 loading rate.

LTE network 120 may identify alternative communication network 140 by the MME processing a Non-Access Stratum (NAS) message transferred by UE 101 over LTE base station 110 indicating that alternative communication network 140 is serving UE 101. The MME may also identify alternative communication network 140 serving UE 101 based on a prior UE registration through the MME over alternative communication network 140. For example, UE 101 may register with a Code Division Multiple Access (CDMA) network over an MME prior to IMS 130 receiving the SIP Invite message for the voice call from the initiating UE to UE 101.

LTE network 120 then determines that the media session should be redirected to alternative communication network 140 based on the status of LTE base station 110 and alternative communication network 140 serving UE 101. The status may be based on a number of QCIs exceeding a QCI threshold, a HARQ retransmission rates exceeding a HARQ retransmission rate threshold, or some other exceeding threshold indicator. The status of LTE base station 110 may contain a buffer value such that media sessions begin to be redirected when LTE base station 110 is nearing a capacity of allocated resources. The status may also be based on excessive resource block congestion, packet loss, packet latency, and packet jitter. For example, an MME may determine that a voice bearer cannot be established and that the voice call should be redirected to a CDMA network based on an eNodeB establishing a near capacity amount of QCI 1s and LTE network 120 determining that UE 101 has pre-registered with a CDMA network.

Next, LTE network 120 transfers a status response to IMS 130 indicating redirection of the media session to alternative communication network 140. The status response is typically sent to a P-CSCF in IMS 130 from a PCRF in LTE network 120. The status response may indicate information pertaining to alternative communication 140, such as the IP address UE 101 received upon attachment to alternative network 140, port addresses, resource constraints, or some other information. For example, LTE network 120 may send a status response to IMS 130 indicating that a HARQ retransmission rate has exceeded a HARQ retransmission rate threshold and that UE 101 has registered with a CDMA network using an indicated IP address.

In a final operation, IMS 130 transfers the SIP Invite message for the media session to UE 101 to alternative communication network 140 serving UE 101. IMS 130 may transfer the SIP Invite message by a Telephony Application Server (TAS) forwarding the SIP Invite message for a voice call to alternative communication network 140. The SIP Invite message may be redirected using a Mobile Switching Center (MSC), a Circuit Switch Fallback (CSFB), a Signaling System 7 (SS7), an Interworking System (IWS), or some other signaling interface capable of transferring redirected SIP Invite messages.

In some examples, a PCRF receives the status request from IMS 130 and transfers the status request to an MME managing UE 101. For example, a PCRF in LTE network 120 may receive a status request for a voice call from a P-CSCF in IMS 130 and direct the status request for a voice call to the MME over a Diameter message between the PCRF and the MME. In other examples, the status request for the media session may be transferred from IMS 130 to the MME in LTE network 120 by a PCRF transferring the received status request to the MME over a Packet Data Network Gateway (P-GW), a Serving Gateway (S-GW), or some other LTE network gateway element.

In some examples, an MME transfers the status request to LTE base station 110 serving UE 101 and receives a base station response transferred by LTE base station 110 indicating QCI 1 retransmission rates for LTE base station 110 serving UE 101. In other examples, an MME transfers the status request to LTE base station 110 serving UE 101 and receives a base station response transferred by LTE base station 110 indicating HARQ retransmission rates for LTE base station 110 serving UE 101. In other examples, an MME transfers a page to UE 101 over LTE base station and receives a page response transferred by UE 101 over LTE base station 110. For example, the MME in LTE network 120 may determine a retransmission rate for UE 101 based on a delay of a page sent to UE 101 and a page response received from UE 101 over LTE base station 110.

In some examples, an MME processes a Non-Access Stratum (NAS) message transferred by UE 101 that indicates the status of LTE base station 110 serving UE 101. In other examples, an MME processes a NAS message transferred by UE 101 that indicates alternative communication network 140. For example, an MME in LTE network 120 may request a QCI 1 loading rate of an eNodeB serving UE 101 and in response, receive a NAS message from UE 101 over the eNodeB indicating a QCI 1 loading level and that UE 101 has previously registered with a CDMA network. In other examples, an MME identifies alternative communication network 140 serving UE 101 based on a prior UE registration through the MME over alternative communication network 140.

FIG. 2 is a flow diagram illustrating an operation of data communication system 100 to redirect a media session to a UE. IMS 130 identifies (201) LTE network 120 serving UE 101. IMS 130 receives (202) a SIP Invite message for the media session to UE 101 and responsively transfers (202) a status request to LTE network 120 serving UE 101. In response to the status request, LTE network 120 identifies (203) a status of LTE base station 110 serving UE 101 and identifies (203) alternative communication network 140 serving UE 101.

In response to the status request, LTE network 120 determines (204) that the media session should be redirected to alternative communication network 140 based on the status of LTE base station 110 and alternative communication network 140 serving UE 101. LTE network 120 transfers (205) a status response to IMS 130 indicating media session redirection to alternative network 140. IMS 130 transfers (206) the SIP Invite message for the media session to UE 101 to alternative communication network 140 serving UE 101.

FIG. 3 is a sequence diagram illustrating the operation of LTE communication system 100 to redirect a media session to a UE. IMS 130 identifies LTE network 120 serving UE 101. IMS 130 receives a SIP Invite message for the media session to UE 101 and responsively transfers a status request to LTE network 120 serving UE 101. In response to the status request, LTE network 120 identifies a status of LTE base station 110 serving UE 101 and identifies alternative communication network 140 serving UE 101.

In response to the status request, LTE network 120 determines that the media session should be redirected to alternative communication network 140 based on the status of LTE base station 110 and alternative communication network 140 serving UE 101. LTE network 120 transfers a status response to IMS 130 indicating media session redirection to alternative network 140. IMS 130 transfers the SIP Invite message for the media session to UE 101 to alternative communication network 140 serving UE 101.

Figure 4:
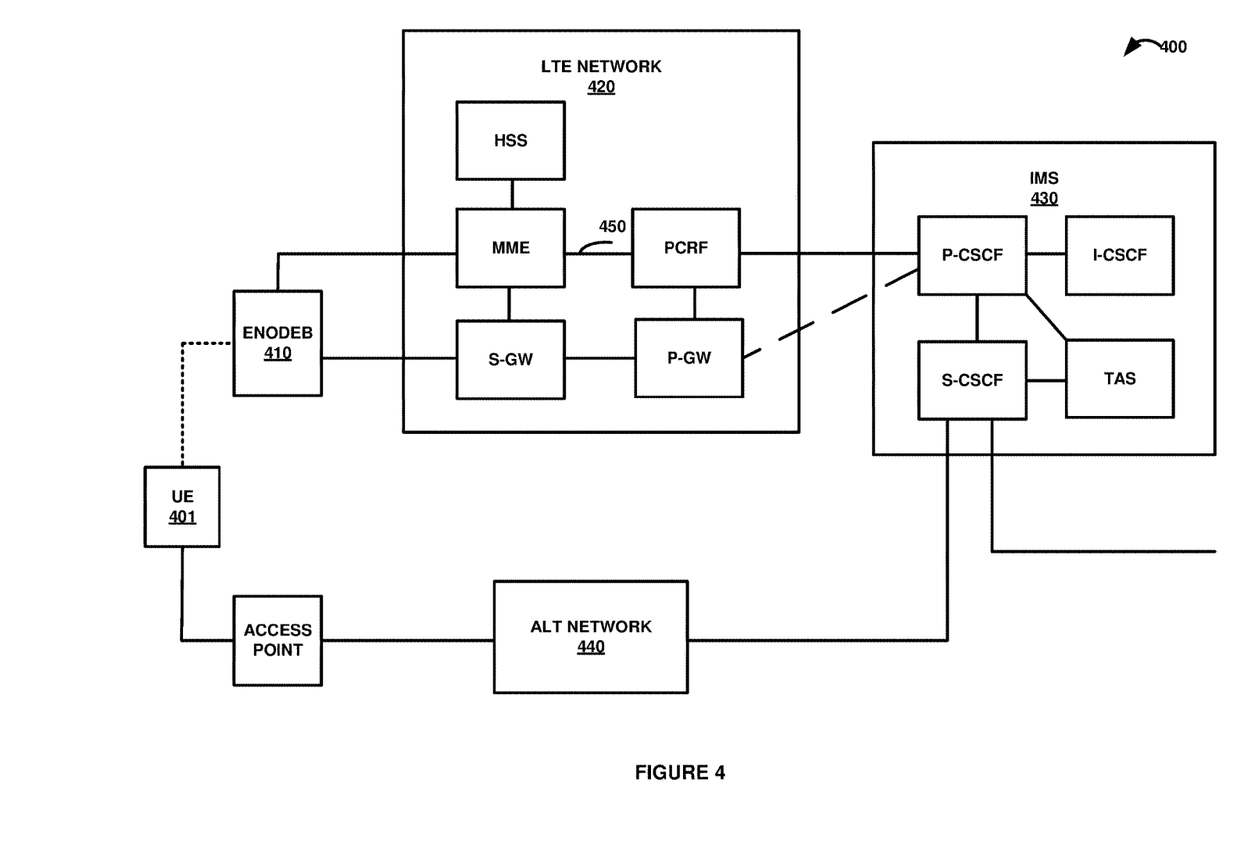
FIGS. 4-6 illustrate a data communication system to redirect a media session to a UE over an alternative network.
Figure 5:
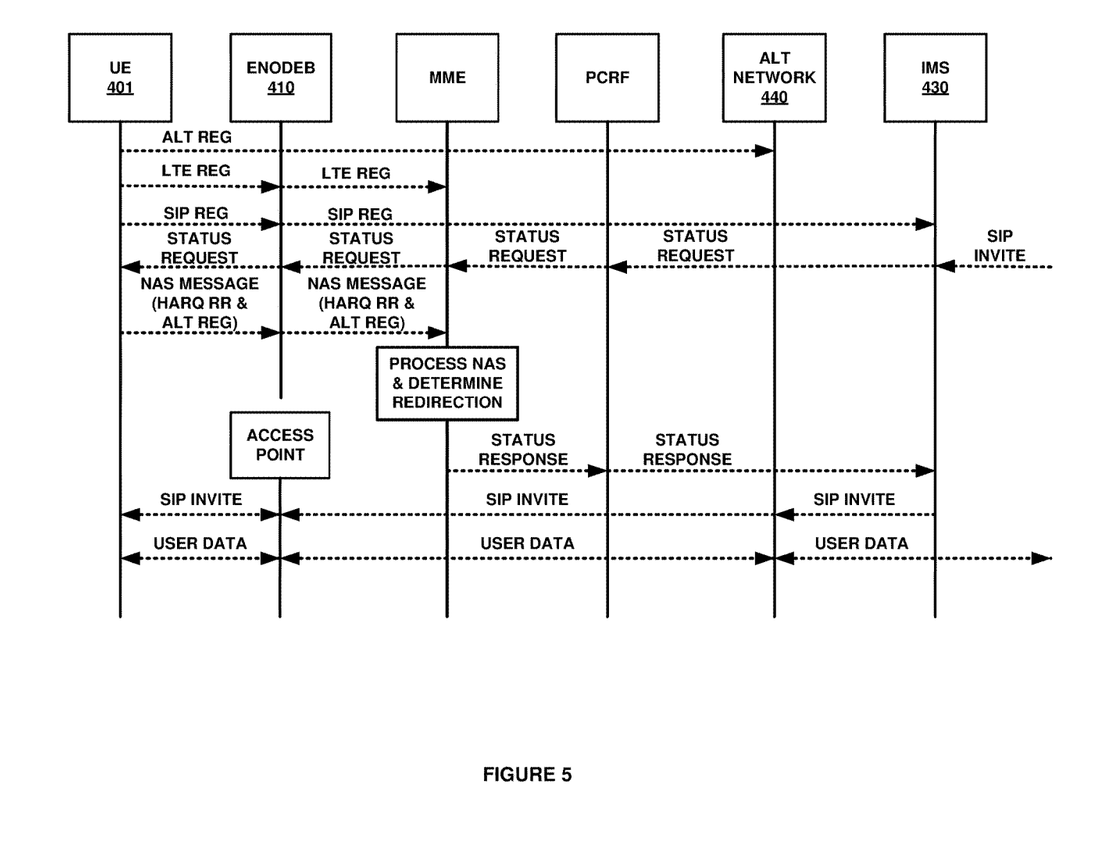
Figure 6:
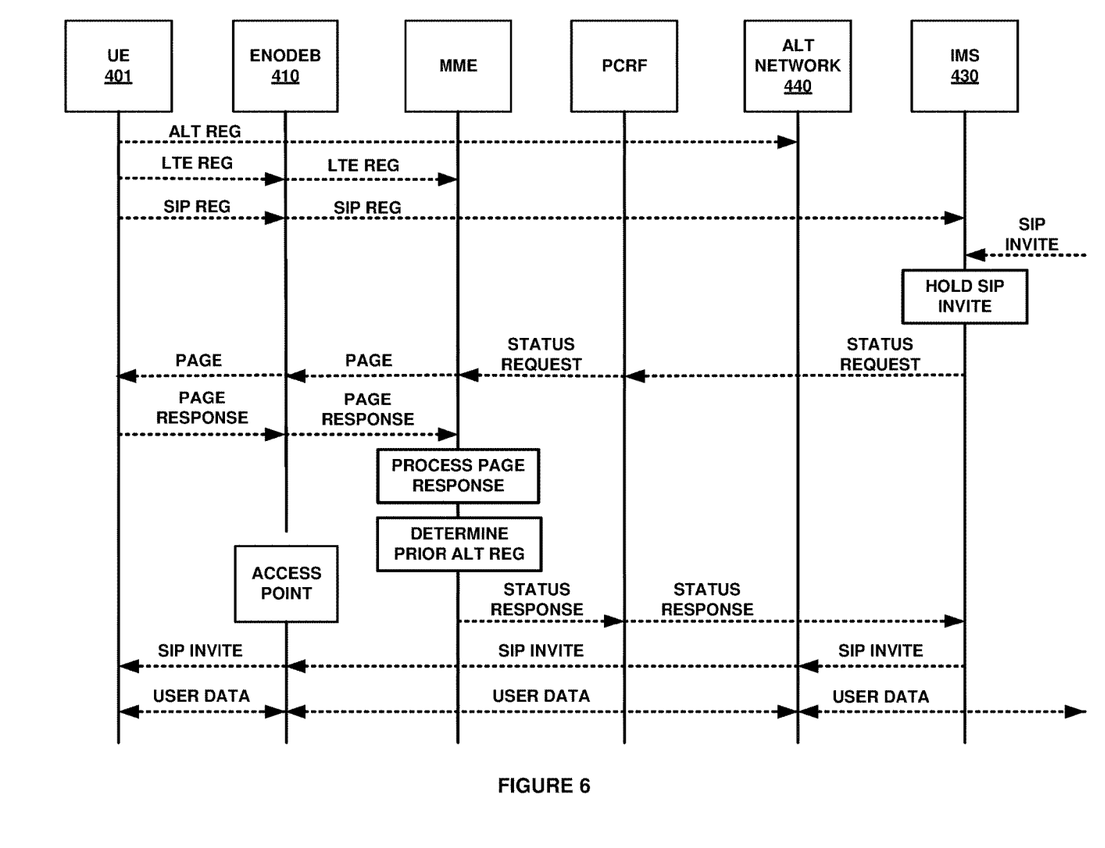

FIGS. 4-6 illustrate data communication system 400 to redirect a media session over an alternative network to a UE. Data communication system 400 is an example of data communication system 100, although data communication system 100 may use alternative configurations and operations. Referring to FIG. 4, data communication system 400 includes UE 401, eNodeB 410, LTE network 420, IMS 430, alternative network 440, and an access point. LTE network 420 includes an S-GW, MME, HSS, P-GW, and PCRF. IMS 430 includes a P-CSCF, Interrogating Call Session Control Function (I-CSCF), Serving Call Session Control Function (S-CSCF), and TAS.

UE 401 and eNodeB 410 exchange data and signaling over a Radio Resource Control (RRC) signaling link as indicated by the dotted line. eNodeB 410 and the S-GW communicate over an S1-U data link. eNodeB 410 and the MME communicate data over an S1-MME data link. The MME queries the HSS and receives Access Point Names (APNs) and associated APN information over a Diameter link. The MME and the S-GW communicate over an S11 data link. The S-GW and the P-GW communicate over an S5 data link. The P-GW and the PCRF communicate over a Diameter link and exchange modify bearer signaling to establish a SIP signaling link between the P-GW and the P-CSCF, such as a QCI 5 as indicated by the dashed line. In this example embodiment, the MME and PCRF exchange data over Diameter link 450.

FIG. 5 illustrates an operation of data communication system 400 to redirect a media session to a UE over an alternative network. In a first operation, UE 401 registers with alternative network 440, such as a Wireless Fidelity (WiFi) network. UE 401 then registers with LTE network 420 over eNodeB 410 and the MME. After registering with LTE network 420, UE 401 performs a SIP registration with IMS 430 over eNodeB 410. IMS 430 then receives a SIP Invite message and responsively transfers a status request for a HARQ retransmission rate to the MME over the PCRF over Diameter link 450.

The MME then transfers the status request to UE 401 over eNodeB 410 which responds with a NAS message indicating a HARQ retransmission rate. The NAS message also indicates that UE 401 has previously registered with alternative network 440. In response to receiving the status response, the MME processes the NAS message from UE 401 over eNodeB 410 and determines that the media session should be redirected to alternative network 440. The MME then transfers a status response to IMS 430 over the PCRF indicating that the media session should be redirected to alternative network 440. IMS 430 then transfers the SIP Invite message for the media session to UE 401 over alternative network 440. UE 401 then exchanges user data with IMS 430 to setup and initiate call procedures over alternative network 440.

FIG. 6 illustrates an alternative operation of data communication system 400 to redirect a media session to a UE over an alternative network. Again, UE 401 registers with alternative network 440 over the Access Point. UE 401 then registers with LTE network 420 over eNodeB 410 and the MME. After registering with alternative network 440 and LTE network 420, UE 401 performs a SIP registration with IMS 430 over eNodeB 410. IMS 430 then receives a SIP Invite message. In response to receiving the SIP Invite message for the media session, IMS 430 holds the SIP Invite message and transfers a status request to the MME over the PCRF using Diameter link 450.

The MME then transfers a page to UE 401 over eNodeB 410 and receives a page response over eNodeB 410. The MME then processes the page response from UE 401 and determines that the media session should be redirected to alternative network 440. In this example embodiment, the MME identifies alternative network 440 based on the prior registration through the MME over alternative network 440. The MME then transfers a status response to IMS 430 over the PCRF indicating that the media session should be redirected to alternative network 440. IMS 430 then takes the hold off of the SIP Invite message and transfers the SIP Invite message for the media session to UE 410 over alternative network 440. UE 401 then exchanges user data with IMS 430 to setup and initiate call procedures over alternative network 440.

Figure 7:
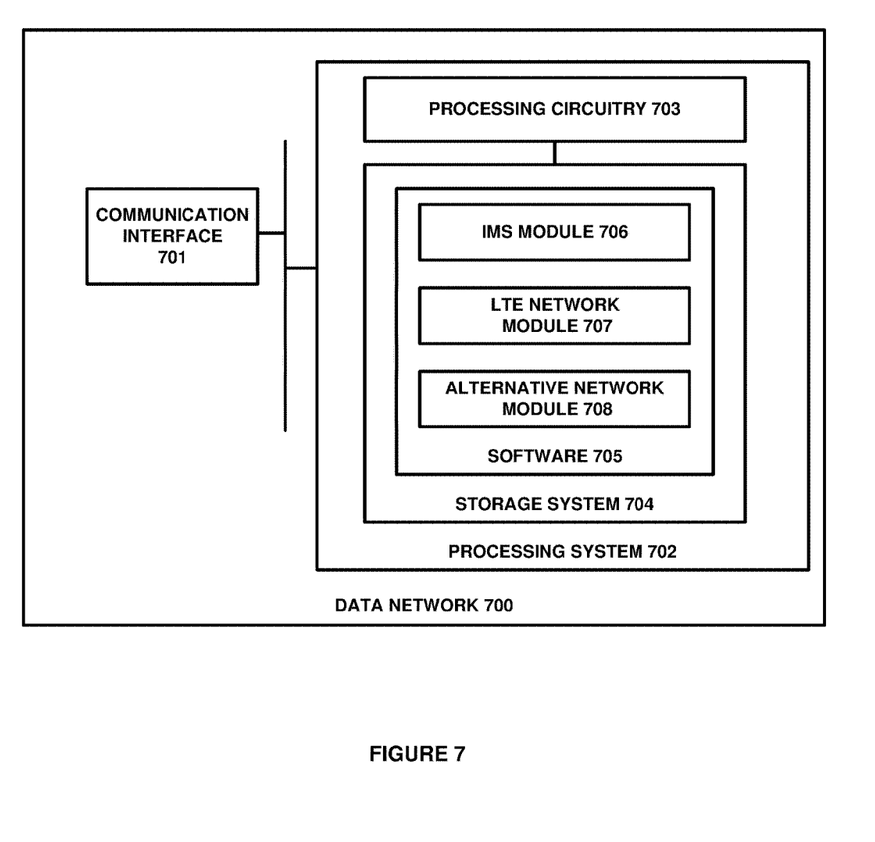
FIG. 7 illustrates a data communication system to redirect a media session to UE.

FIG. 7 illustrates data communication system 700. Data communication system 700 is an example of data communication system 100 and data communication system 400, although data communication system 100 and data communication system 400 may use alternative configurations and operations. Data communication system 700 includes communication interface 701 and data processing system 702. Data processing system 702 is linked to communication interface 701.

Communication interface 701 comprises communication components, such as antennas, ports, amplifiers, filters, modulators, signal processors, and the like. Communication interface 701 receives and transfers status requests and responses and SIP Invite messages.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus.

Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate data communication system 700 as described herein.

In particular, when executed by processing circuitry 703, IMS module 706 directs processing circuitry 704 to identify an LTE network serving a UE. When executed by processing circuitry 703, IMS module 706 also directs processing circuitry 704 to receive a SIP Invite message for a media session to a UE and responsively transfer a status request to the LTE network. When executed by processing circuitry 703, LTE network module 707 directs processing circuitry 703 to identify a status of an LTE base station serving the UE and identify an alternative communication network serving the UE. When executed by processing circuitry 703, LTE network module 707 also directs processing circuitry 703 to determine that a media session should be redirected to an alternative communication network based on the status of the LTE base station and the identified alternative communication network serving the UE.

When executed by processing circuitry 703, LTE network module 707 also directs processing circuitry 703 to transfer a status response to the IMS indicating media session redirection to the alternative communication network. When executed by processing circuitry 703, alternative communication network module 708 directs processing circuitry 703 to transfer the SIP Invite message for the media session to the UE to the alternative communication network serving the UE.

Referring back to FIG. 1, UE 101 includes a user interface, memory device, software, processing circuitry, Radio Frequency (RF) communication circuitry, or some other communication components. UE 101 may be a telephone, computer, e-book, mobile Internet appliance, wireless network interface card, media player, game console, or some other wireless communication apparatus—including combinations thereof. UE 101 is a dual mode device capable of communicating over multiple wireless protocols, including LTE wireless networks and non-LTE wireless networks.

LTE network 120 comprises computers, bus interfaces, and communication ports that comprise processing circuitry and memory devices to store and execute various software modules. LTE network 120 may also include other components such as a router, server, data storage system, and power supply. LTE network 120 may reside in a single device or may be distributed across multiple devices. LTE network 120 may comprise packet gateways of various types like S-GWs, P-GWs, High Speed Packet Access Gateways (HSPA-GWs), High Rate Packet Data Gateways (HRPD-GWs), Evolved Packet Data Gateways (ePDGs), Multimedia Broadcast Multicast Service Gateways (M-GWs), a Broadcast Multicast Service Center (BM-SC), and/or some other type of data packet interface into an LTE system. LTE network 120 may also include PCRFs, On-line Charging Systems (OCSs), and various LTE control systems, such as MMEs, HSS, and DNS.

Alternative communication network 140 comprises communication and control systems for providing UE 101 access to IMS 130 and other communication services. Alternative communication network 140 may comprise non-LTE networks such as Code Division Multiple Access (CDMA), Evolution-Data Optimized (EVDO), Global System for Mobile Communication (GSM), Worldwide Interoperability for Microwave Access (WiMAX), Wireless Fidelity (WiFi), or some other cellular or wireless communication format, including combinations, improvements, or variations thereof.

LTE base station 110 includes communication interfaces, network interfaces, processing systems, computer systems, microprocessors, storage systems, storage media, or some other processing devices or software systems, and may be distributed among multiple devices. In particular, LTE base station 110 may be configured to provide wireless coverage to one or more UEs.

Wireless links 150-151 may use air, space, or some other wireless material that transports media. Wireless links 150-151 may use protocols, such as LTE, Code Division Multiple Access (CDMA), Evolution Data Only (EVDO), IP, or some other wireless communication formats—including combinations thereof. Communication links 152-155 may use metal, glass, optics, air, space, or some other material as the transport media. Communication links 152-155 may use Time Division Multiplexing (TDM), IP, Ethernet, Synchronous Optical Networking (SONET), communication signaling, wireless communications, or some other communication format—including improvements thereof. Communication links 152-155 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a User Equipment (UE) to establish a media session using an Internet Multimedia Subsystem (IMS), the method comprising:
    the UE registering with a Long Term Evolution (LTE) network and registering with the IMS over the LTE network;
    the UE registering with a Wireless Fidelity (WIFI) network;
    the UE receiving a status request from the LTE network responsive to a Session Initiation Protocol (SIP) invite for the UE received at the IMS;
    the UE transferring a status response to the LTE network that indicates the WIFI network responsive to the status request;
    the UE receiving the SIP invite from the IMS over the WIFI network; and
    the UE exchanging user data for the media session over the WIFI network.

2. The method of claim 1 wherein the status response transferred by the UE further indicates a network address for the UE on the WIFI network.

3. The method of claim 1 wherein the status response transferred by the UE further indicates a network port for the UE on the WIFI network.

4. The method of claim 1 wherein the status response transferred by the UE further indicates LTE network performance.

5. The method of claim 1 wherein the status response transferred by the UE further indicates LTE base station performance.

6. The method of claim 1 wherein the status response transferred by the UE further indicates LTE base station load.

7. The method of claim 1 wherein the status response transferred by the UE further indicates data retransmission rates.

8. The method of claim 1 wherein the status response transferred by the UE further indicates Hybrid Automatic Repeat Request (HARQ) retransmission rates.

9. The method of claim 1 wherein the status response transferred by the UE comprises a Non-Access Stratum (NAS) message.

10. The method of claim 1 wherein the status response transferred by the UE comprises a Mobility Management Entity (MME) message.

11. A User Equipment (UE) to establish a media session, the UE comprising:
   Radio Frequency (RF) communication circuitry configured to communicate with a Long Term Evolution (LTE) network and with a Wireless Fidelity (WIFI) network;
   processing circuitry configured to register with the Long Term Evolution (LTE) network, register with an Internet Multimedia Subsystem (IMS) over the LTE network, and register with the Wireless Fidelity (WIFI) network;
   the processing circuitry configured to receive a status request from the LTE network responsive to a Session Initiation Protocol (SIP) invite for the UE received at the IMS and transfer a status response to the LTE network that indicates the WIFI network responsive to the status request; and
   the processing circuitry configured to receive the SIP invite from the IMS over the WIFI network and exchange user data for the media session over the WIFI network.

12. The UE of claim 11 wherein the processing circuitry is configured to transfer the status response indicating a network address for the UE on the WIFI network.

13. The UE of claim 11 wherein the processing circuitry is configured to transfer the status response indicating a network port for the UE on the WIFI network.

14. The UE of claim 11 wherein the processing circuitry is configured to transfer the status response indicating LTE network performance.

15. The UE of claim 11 wherein the processing circuitry is configured to transfer the status response indicating LTE base station performance.

16. The UE of claim 11 wherein the processing circuitry is configured to transfer the status response indicating LTE base station load.

17. The UE of claim 11 wherein the processing circuitry is configured to transfer the status response indicating data retransmission rates.

18. The UE of claim 11 wherein the processing circuitry is configured to transfer the status response indicating Hybrid Automatic Repeat Request (HARQ) retransmission rates.

19. The UE of claim 11 wherein the processing circuitry is configured to transfer the status response in a Non-Access Stratum (NAS) message.

20. The UE of claim 11 wherein the processing circuitry is configured to transfer the status response in a Mobility Management Entity (MME) message.

* * * * *